May 31, 1966   W. R. PENROD ETAL   3,253,795
PAPER MACHINERY
Filed June 5, 1962   11 Sheets-Sheet 1
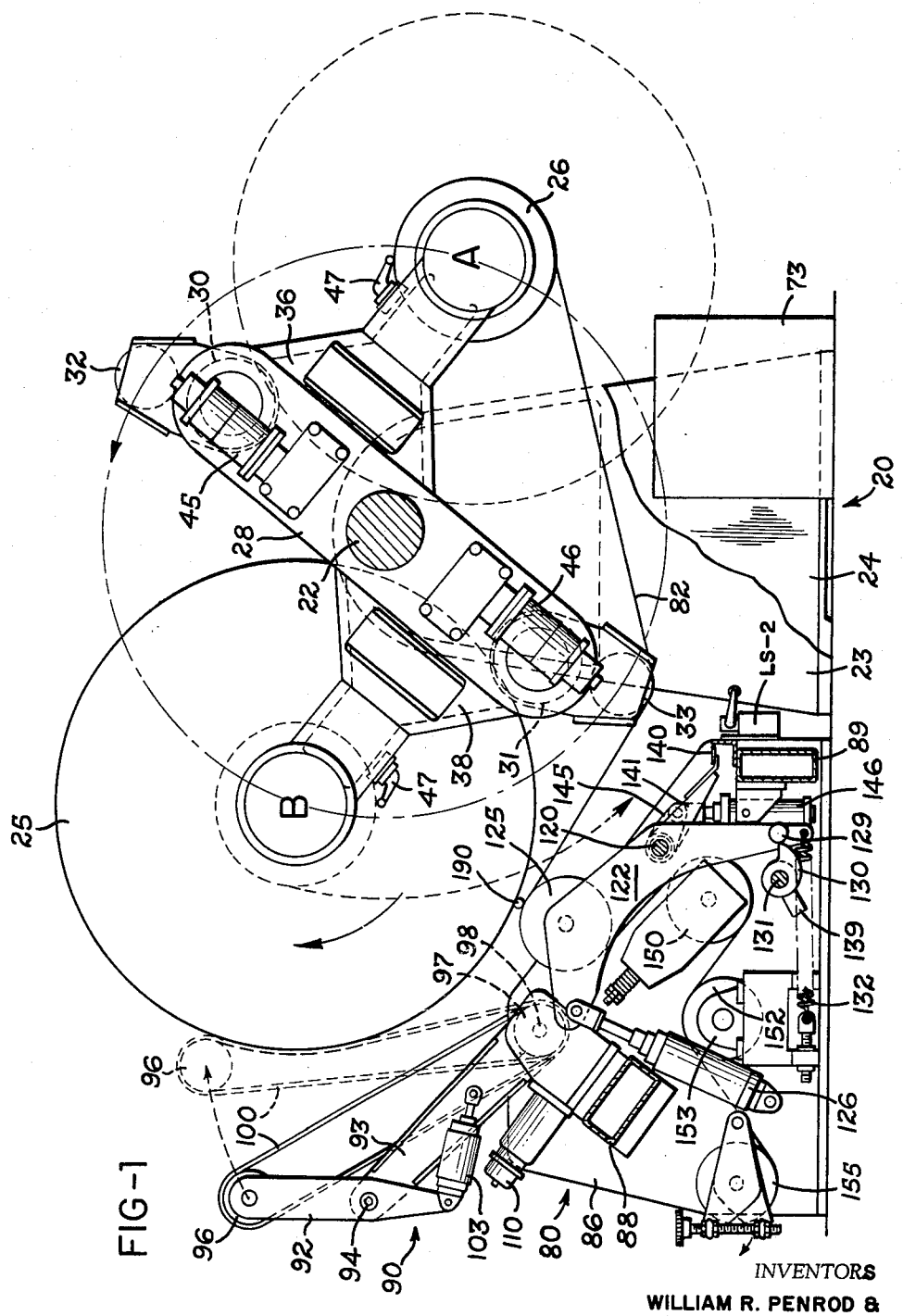
INVENTORS
WILLIAM R. PENROD &
BY  WILLIAM P. WENTWORTH
Marshal, Biebel, French & Bugg
ATTORNEYS

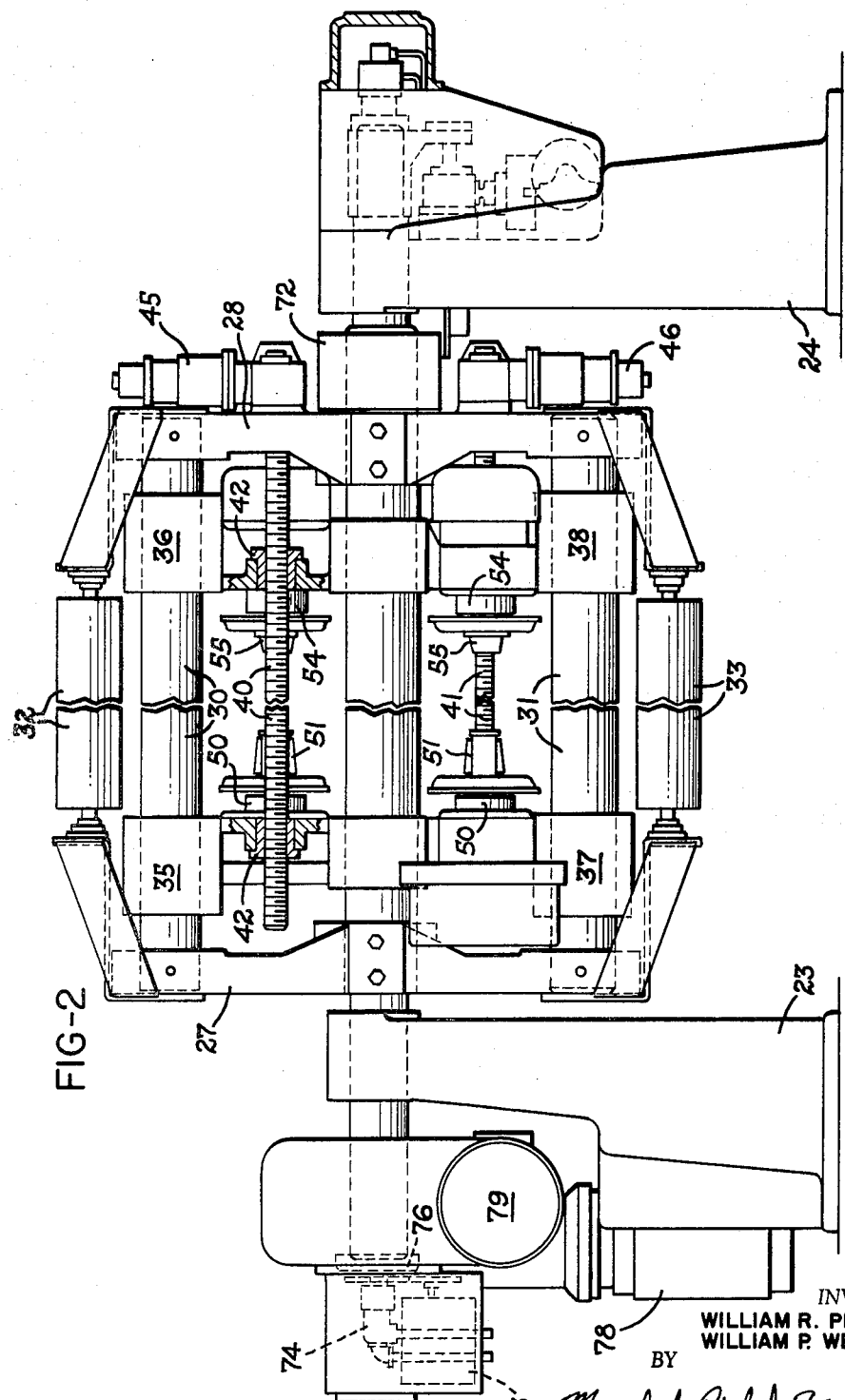

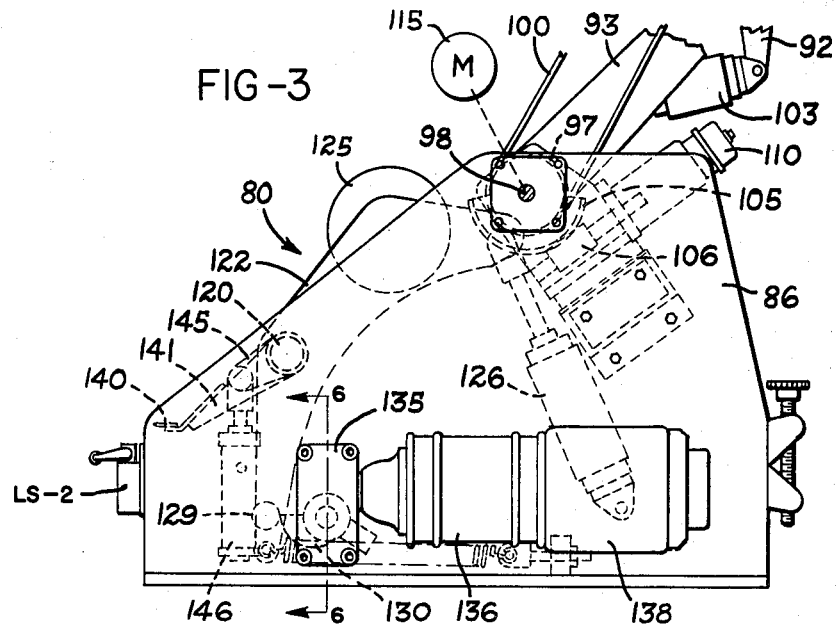
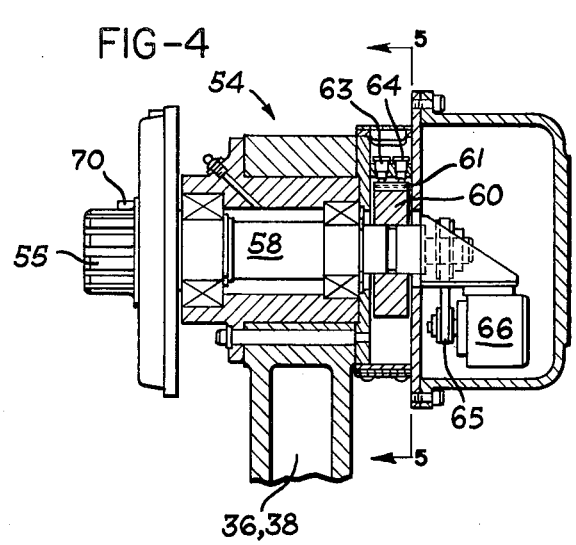
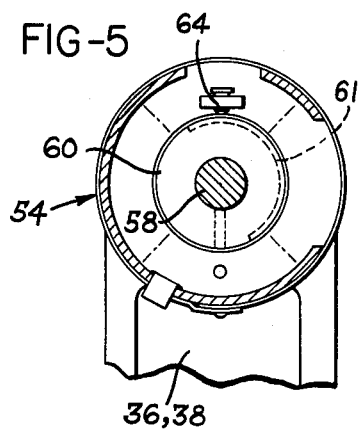

May 31, 1966 W. R. PENROD ETAL 3,253,795
PAPER MACHINERY
Filed June 5, 1962 11 Sheets-Sheet 4
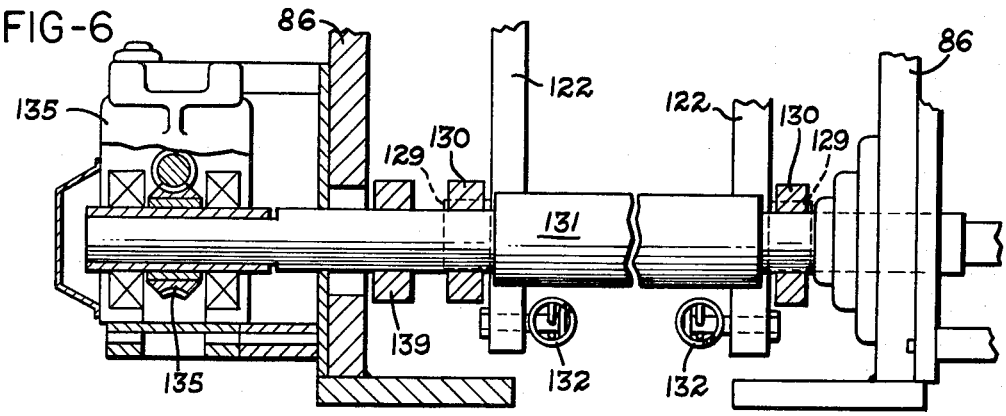
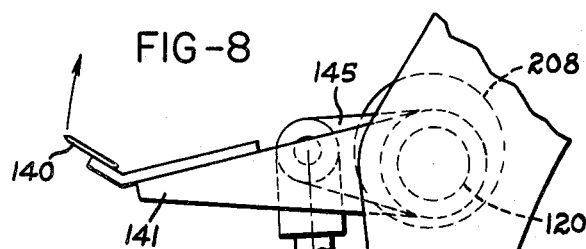
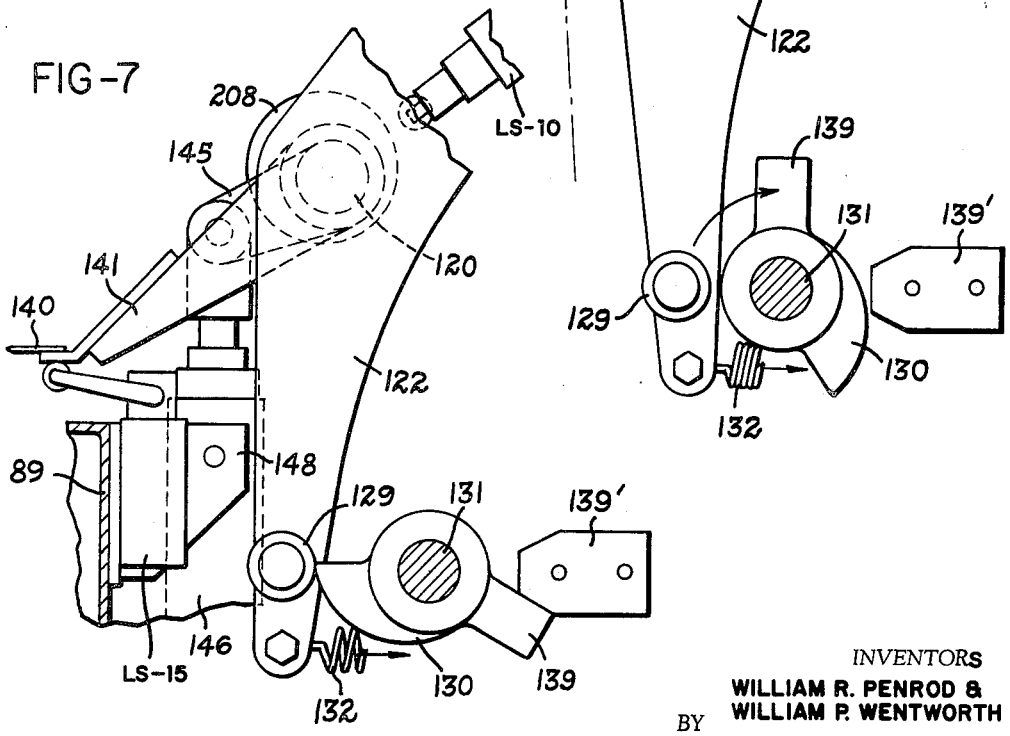
INVENTORS
WILLIAM R. PENROD &
WILLIAM P. WENTWORTH
BY Marechal, Biebel, French & Bugg
ATTORNEYS May 31, 1966 W. R. PENROD ETAL 3,253,795
PAPER MACHINERY
Filed June 5, 1962 11 Sheets-Sheet 5
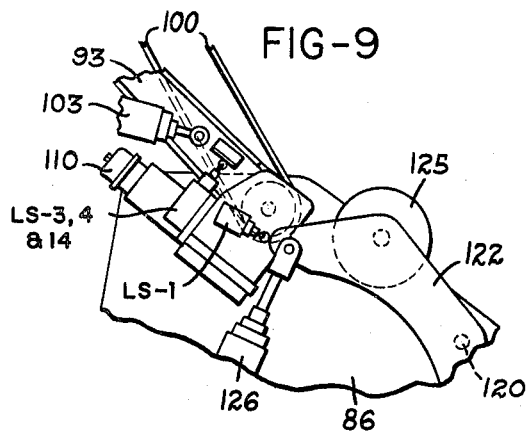
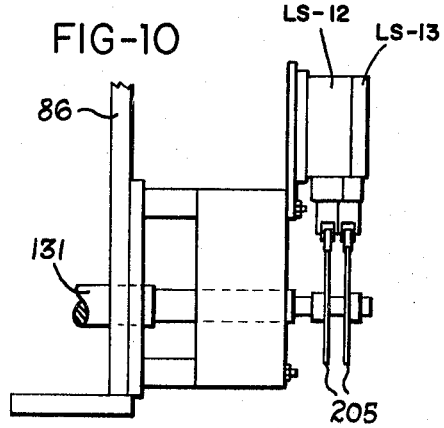
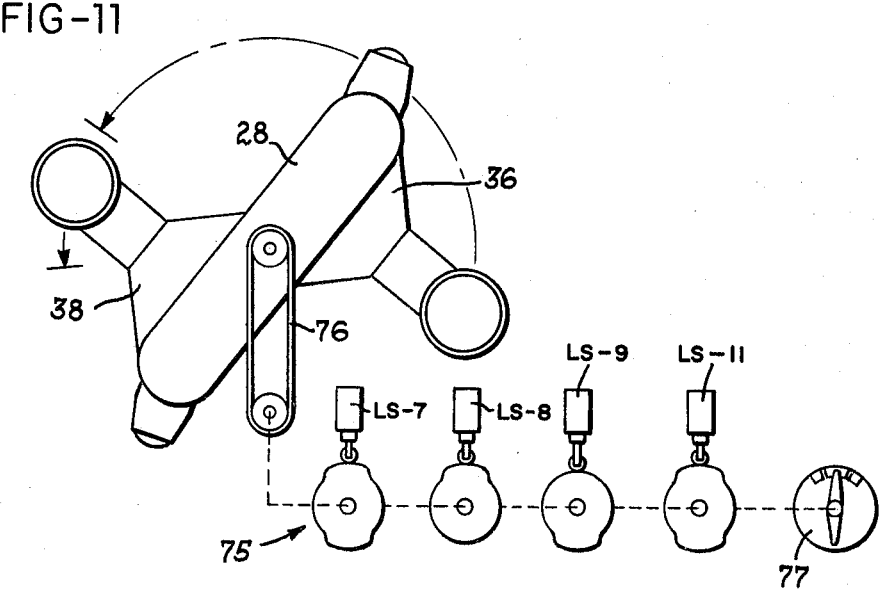
INVENTORS
WILLIAM R. PENROD &
WILLIAM P. WENTWORTH
BY
*Marshal, Biebel, French & Bugg*
ATTORNEYS May 31, 1966   W. R. PENROD ETAL   3,253,795
PAPER MACHINERY
Filed June 5, 1962   11 Sheets-Sheet 6
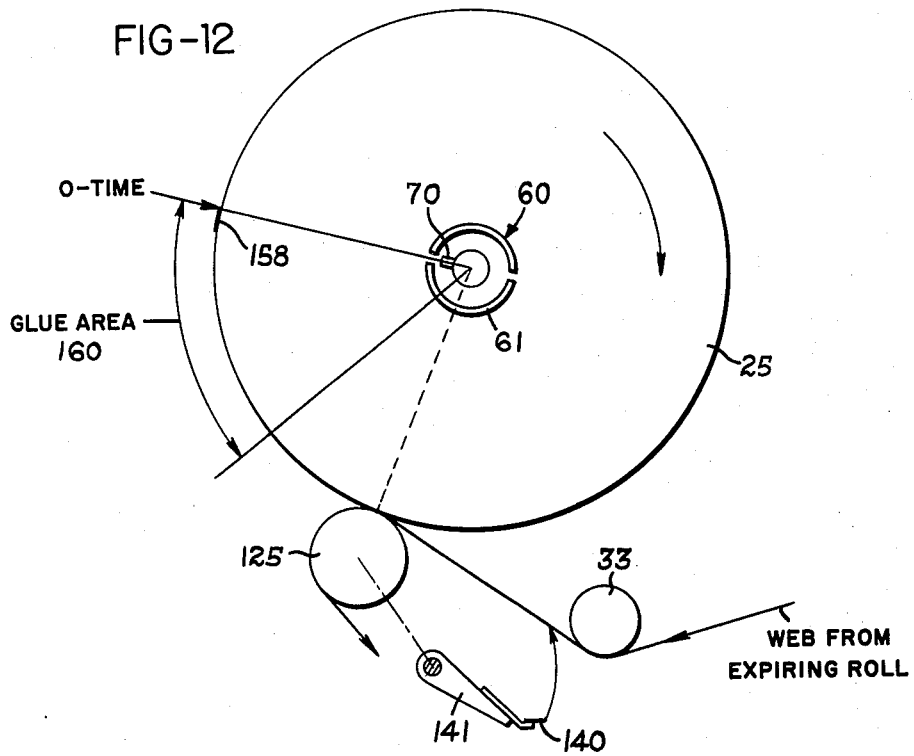
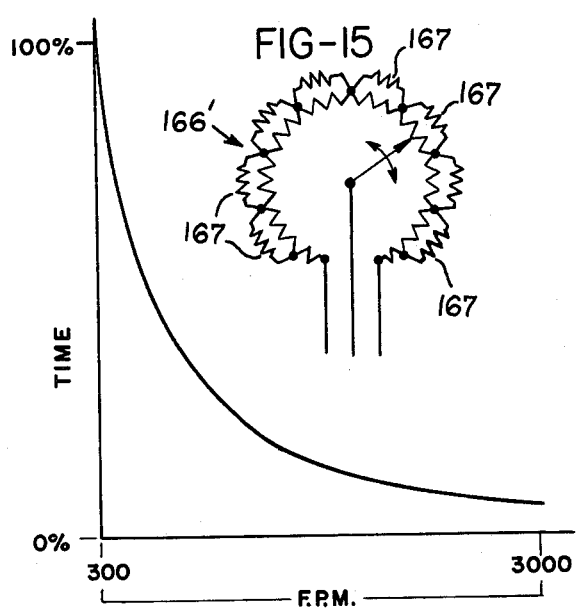
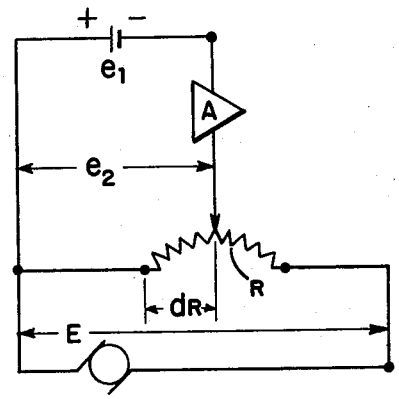
INVENTORS
WILLIAM R. PENROD &
BY WILLIAM P. WENTWORTH
*Marechal, Biebel, French & Bugg*
ATTORNEYS

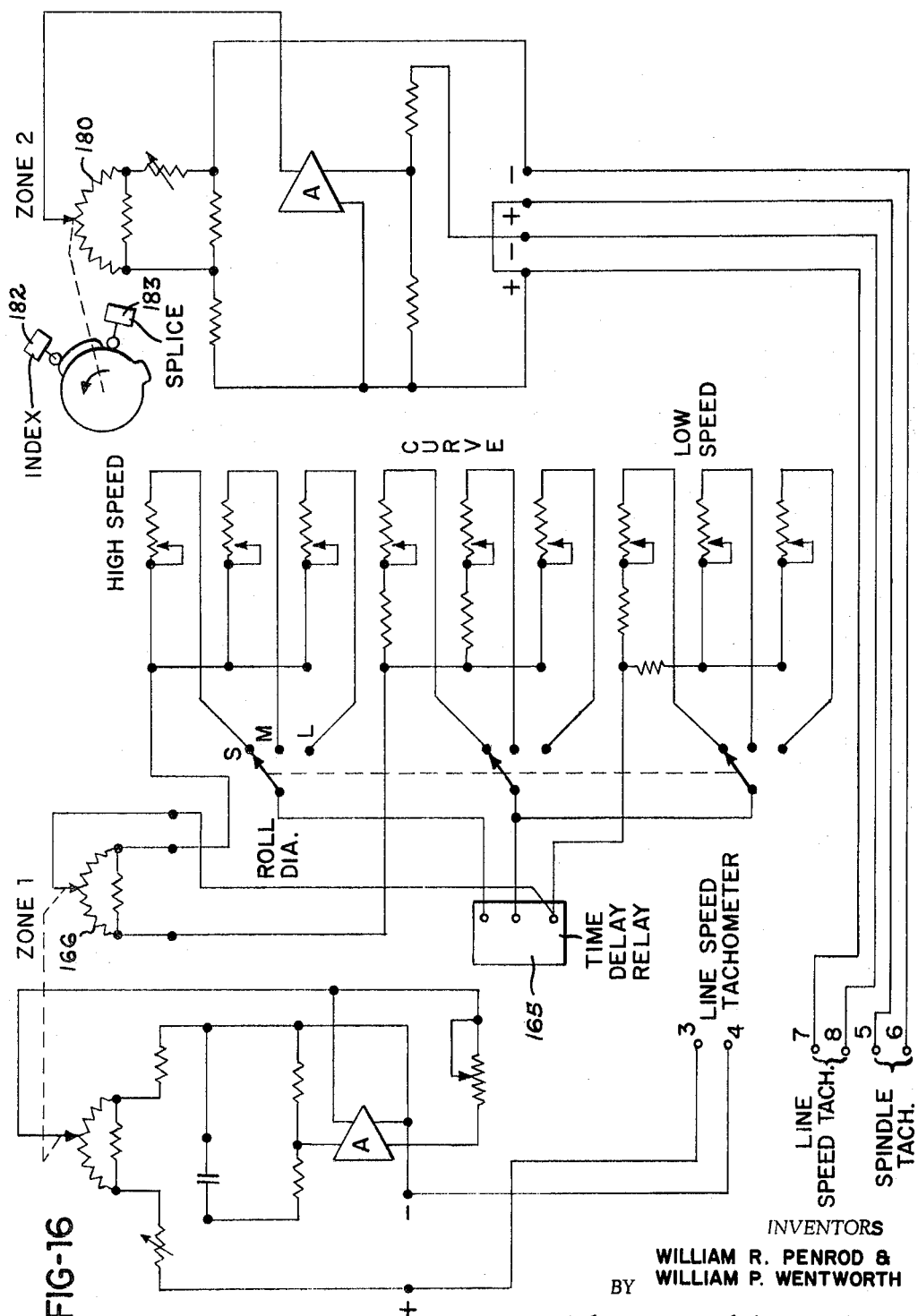

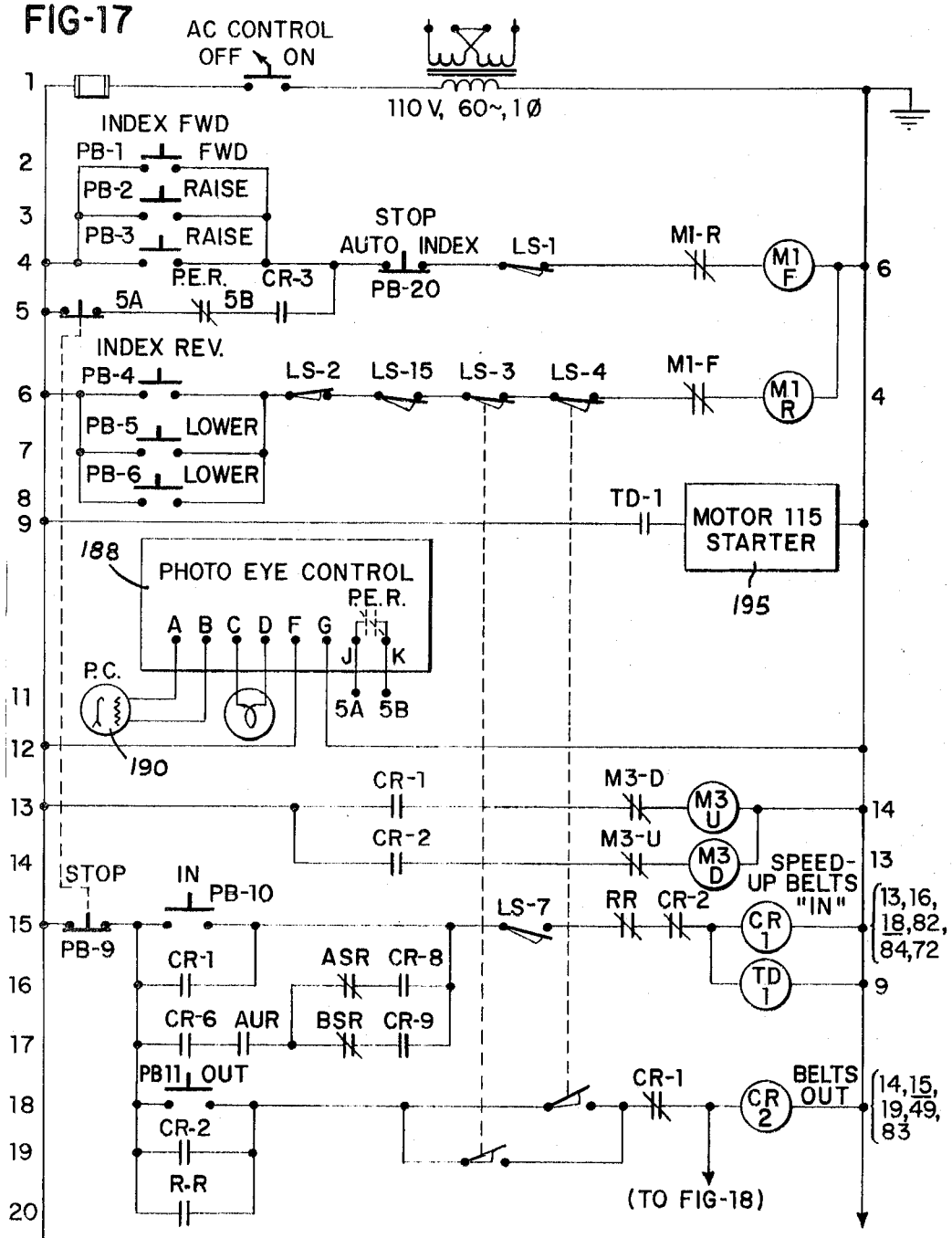

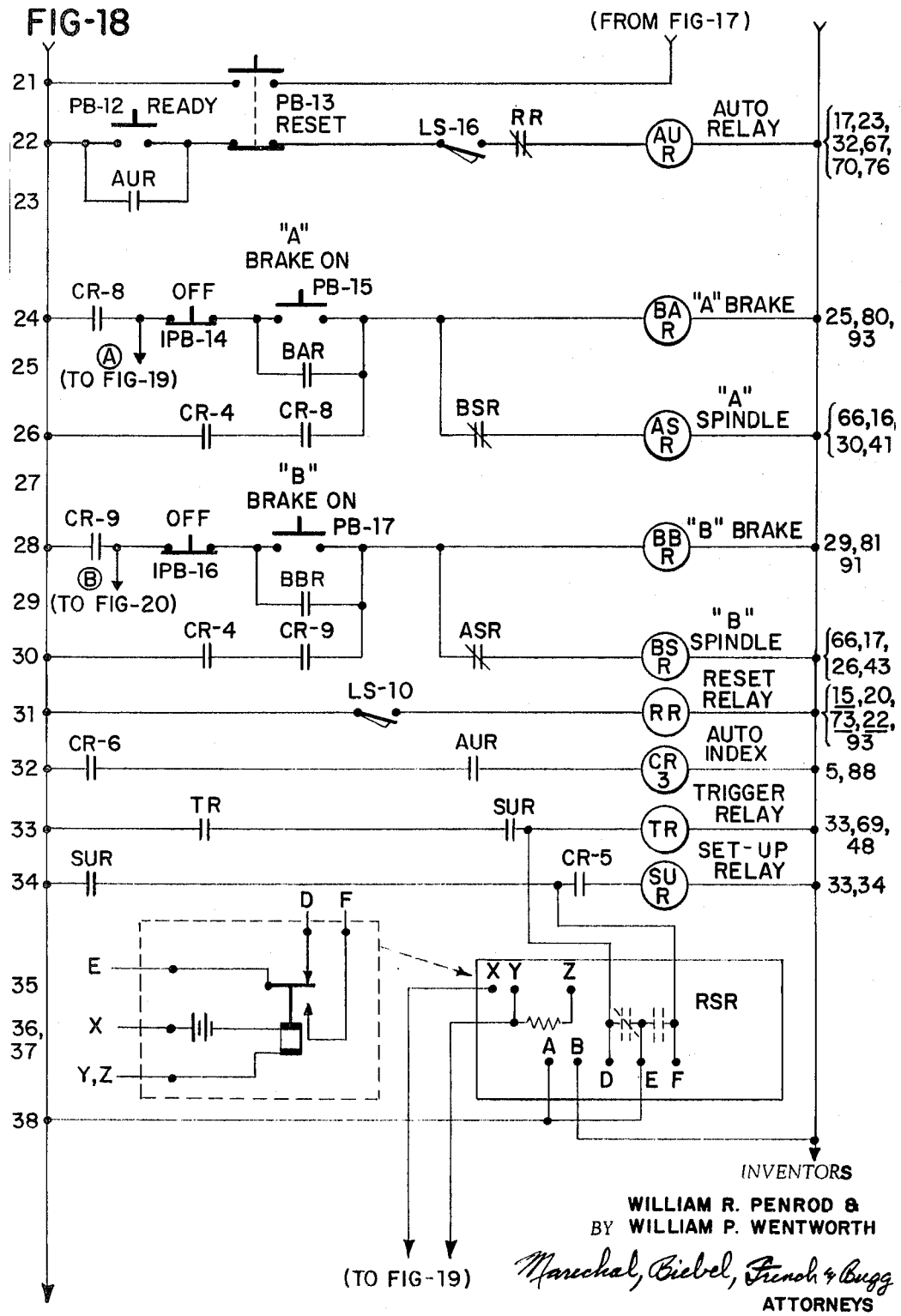

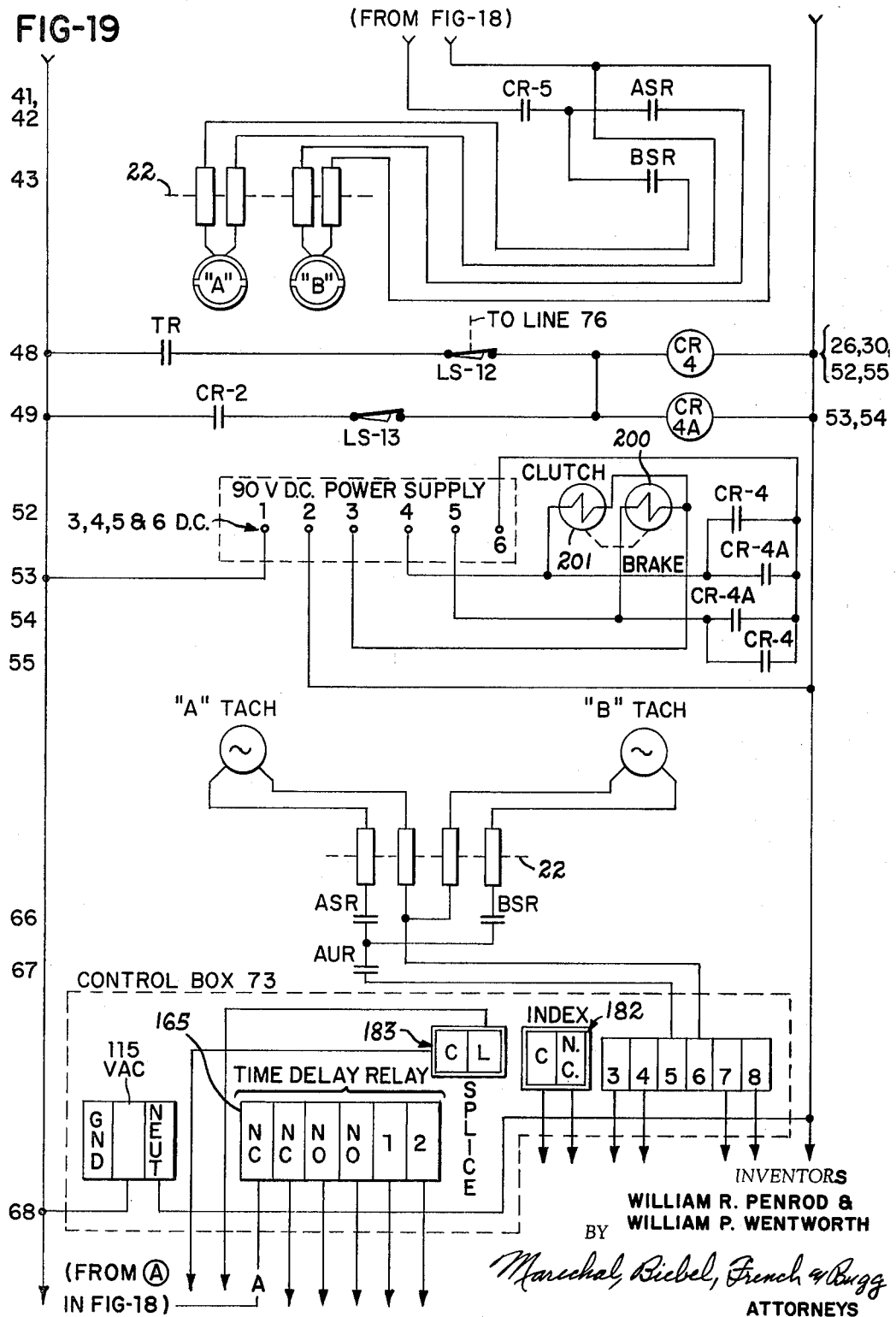

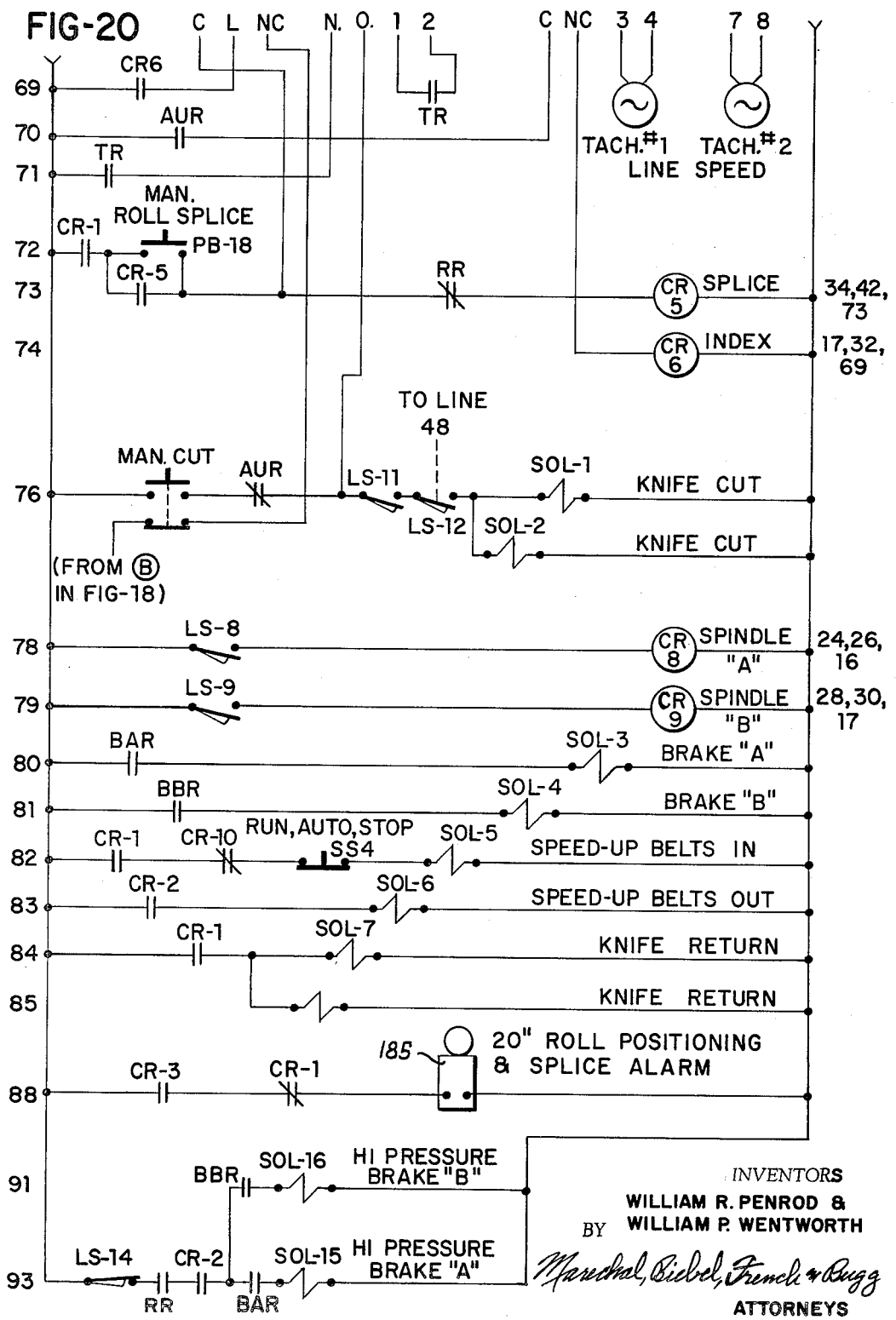

United States Patent Office 3,253,795
Patented May 31, 1966

3,253,795
PAPER MACHINERY
William R. Penrod, Oswego, and William P. Wentworth, Lysander, N.Y., assignors to The Black-Clawson Company, Hamilton, Ohio, a corporation of Ohio
Filed June 5, 1962, Ser. No. 200,150
16 Claims. (Cl. 242—58.2)

This invention relates to an automatic splicing unwind and more particularly to an unwind which automatically splices the starting edge of a new roll onto the web from an expiring roll, and then severs the web leading from the expiring roll with a minimum of waste of material on such roll and with a controlled minimum tail length behind the splice, over a wide range of operating line speeds, and further relates to a method for making such splices.

Automatic splicing unwinds are known which operate with fixed diameter rolls and with line speeds are substantially uniform, in any given installation, from one splice to the next. However, such devices are not suitable for supplying a continuous web of paper to a web treating operation, such as a coater, where the diameters of the new rolls may vary or where the line speeds may vary or be changed. It is therefore an important object of this invention to provide automatic splicing unwind which effects a splice with a controlled length of tail following the glue area over a wide range of splicing speeds and roll diameters.

A further object of this invention is to provide completely automatic machinery which operates to place the web into running contact with the new roll ahead of the glue area so that the full peripheral extent of the glue area is brought into contact with the web. This problem is particularly acute in small rolls, such as 32 inches in diameter, with web speeds in excess of 2,000 feet per minute, where an operator could not make a manual splice with visual reference to an index line turning on the new roll. In such circumstances it was often necessary for the operator to permit the new roll to make an additional revolution to assure that he had actually achieved a splice before he initiated the cutting operation. Accordingly, the tail which would be carried through would be long or short depending upon the dexterity of the operator.

The control of the tail length over a wide range of operating line speeds is accomplished in this invention by operating the knife in a time interval which is controlled independent of the operation of the paster roll. Automatic controls are provided by which the knife impact time and the paster device operation are separately effected in relation to line speed, resulting in the optimum operation of both the paster and the knife in relation to the glue area on the new roll.

An important fact which was developed in the course of this invention was that in order to maintain a given tail length behind the splice, it is necessary to vary the timing of the knife according to the reciprocal of line speed. Therefore, another important object of this invention is to provide a controllable knife delay which characterizes a generally parabolic curve $$x = \frac{K}{y}$$

where $x$ equals delay, $K$ is a constant, and $y$ is line speed. Preferably, the paster device is operated without a variable delay, but it is within the scope of this invention to control similarly the operation of the paster with a variable delay according to the manner of operating the cutting knife.

A further object of this invention is the provision of automatic circuits which utilize the highest proportion of paper on the expiring roll to the end that a minimum of waste occurs.

Another important object of this invention is to provide an automatic unwind which operates to splice a new roll onto a moving web automatically without any attention from the operator where the new roll may vary in diameter from one time to the next. It has been found that differing diameters of the new roll to be spliced with a given line speed will result in differing tail lengths following the splice in the absence of compensation for roll diameter. Accordingly, a further object of this invention is to provide automatic compensation for roll diameter resulting in predictable and uniform tail lengths over a wide range of new roll diameters.

Another object of this invention is the provision of a new roll speed-up assembly which brings the new roll up to pasting speed just prior to the intended pasting and cutting operation. The invention includes a control for bringing speed-up belts into contact with the new roll subsequent to the indexing of such roll, and includes a variable or adjustable delay for operating the speed-up belts only after they are in contact with the new roll plus a fixed time after contact to reduce as much as practicable the duration of time which the new roll is left in a free running state prior to splicing. This control therefore eliminates much of the difficulties of prior devices by decreasing the opportunity of the new roll becoming laterally displaced by telescoping, or for air to get under the leading edge to cause unraveling.

Another object of this invention is to provide an automatic indexing control which moves a new roll into splicing position according to the diameter of the roll and which is effective to compensate for any out-of-round condition by repositioning the roll according to its mean diameter during the speed-up of the roll.

A still further object of this invention is the provision of a motor driven paster roll drive and electromagnetic control therefor whereby the paster roll is controlled by a signal taken from the spindle of the new roll in accurately timed relation to the area of paste on the new roll for positive movement of the web into contact with the new roll and for positive retraction therefrom following splicing. This movement is preferably accomplished a positive, cam-operated paster roll.

A still further object of this invention is the provision of an arrangement for effecting accurate timing of the splicing operation in relation to the paster tabs and the glue area on the new roll by means of a 180° slip ring in the timing spindle of the new roll which is electrically correlated with a key on the chuck of the spindle. The key provides a visual index for the operator in preparing the new roll and the slip ring provides accurate automatic initiation of the paster cycle and the cutting cycle.

Another important object of this invention is to provide an automatic splicing machine including a paster device and a cutting device wherein each of such devices operate in timed sequence independently of each other and wherein this timed sequence is initiated by a signal from the spindle of the new roll.

A still further important object of this invention is the provision of a method for automatically joining a new roll onto a web being drawn from an expiring roll.

Other objects and advantages of the invention will be apparent from the following description, the accompanying drawings and the appended claims.

In the drawings—

FIG. 1 is an elevational side view of an automatic unwind constructed according to this invention with certain of the parts being broken away for clarity;

FIG. 2 is a partially broken away end view of the main shaft assembly as viewed from the position of the paster assembly;

FIG. 3 is a partial elevational view of the paster assembly looking at the side opposite from that of FIG. 1;

FIG. 4 is a section through one of the timing spindles;

FIG. 5 is a vertical section taken generally along the line 5—5 of FIG. 4 showing one of the split timing rings;

FIG. 6 is an enlarged fragmentary vertical section of the paster roll operating cam shaft assembly taken generally along the line 6—6 of FIG. 3;

FIG. 7 is an enlarged fragmentary view of the lower end of one of the paster arms and the knife bar showing the position of one of the timing cams prior to splice;

FIG. 8 is a view similar to FIG. 7 showing the moved position of the parts during a splicing operation;

FIG. 9 is a somewhat diagrammatic view of a portion of the paster assembly showing the placement of limit switches;

FIG. 10 is a fragmentary view of one end of the cam shaft on the paster assembly showing the position of limit switches, which view forms an extension of the right-hand portion of FIG. 6;

FIG. 11 is a schematic view of the main shaft assembly carriage and the limit switch as which are positioned thereby;

FIG. 12 is a diagram illustrating the principles of operation of this invention;

FIG. 13 is a graph showing the relationship between knife operating time and line speed;

FIG. 14 is an electrical diagram showing one arrangement for characterizing the curve of FIG. 13;

FIG. 15 is another electrical diagram showing another arrangement for characterizing the curve of FIG. 13;

FIG. 16 is an electrical schematic diagram of the Zone 1 and Zone 2 servo amplifier units; and FIGS. 17–20 comprise the electrical control diagram of this invention when they are connected with the bottom of the figure having the lower number joined to the top of the figure having the higher number.

The term "web" or "paper web" as used in this specification means any form of ribbon material, including but not limited to paper, paper board, film, foil, or any combination of these materials, which is to be unwound from a roll with transfer from an old roll to a new roll without an operator assisting in the transfer process. The automatic splicing unwind of this invention is divided generally into three major assemblies, the main shaft assembly, the paster assembly and the control box. The main shaft assembly which supports the new roll and the expiring roll will be described first.

*Main shaft assembly*

The main shaft assembly 20 is shown in FIGS. 1 and 2 as having a steel cross shaft 22 which is rotatably supported off of the floor by two heavy cast iron pedestals 23 and 24, one at either end of the cross shaft 22. The pedestals 23 and 24 also serve as bearings to provide for the rotation of the main shaft 22.

Means are provided on the main shaft assembly 20 for rotatably supporting a new roll 25 and an expiring roll 26 in spaced apart relation. This supporting or carriage means consists of a pair of outboard rigid spider arms 27 and 28 which are keyed to and supported on the main shaft 22 for rotation therewith. The ends of the spider arms 27 and 28 are each bored out for accepting a cylindrical dead cross shaft 30 and 31. Spaced outwardly of each of the dead cross shafts 30 and 31 are auxiliary rolls 32 and 33.

Four individually adjustable cast iron inside spider arms 35–38 are mounted in opposed pairs in a slide key arrangement between the outboard arms 27 and 28 and are arranged for sliding movement upon the dead cross shafts 30 and 31. The arms are split so as to allow transversing the distance independently between the fixed spider arms 27 and 28. The inner arms 35 and 36 and the mechanism associated therewith is preferably identical to the arms 37 and 38 and the mechanism associated with these arms, and each of the pairs of inner arms 35, 36 and 37, 38 are provided with means for rotatably supporting a roll of the web material. These pairs of adjustable arms are power driven by means of turn buckle screws 40 and 41 extending through nuts 42 on the respective arms. A reversing air motor and gear reduction drive 45 and 46 with a three-position control valve 47 provide power for the chucking of rolls of differing widths, by the rotation of one of the turn buckle screws 40 and 41.

The opposite ends of each of the inner spider arms is bored to accept combination chuck and spindle assemblies. Accordingly, the arms 35 and 37 are each provided with identical brake spindles 50. The brake spindles 50 include a nose or chuck 51 which is adapted to be inserted within one end of a core. The brake spindles 50 each include a pneumatic or air-operated brake which may be modulated as the diameter of the roll changes to provide a constant tension in the web being drawn from the roll.

The opposite inner spider arms 36 and 38 forming the pairs of arms are each provided with a timing spindle assembly 54, one of which is shown in greater detail in FIGS. 4 and 5. The timing spindle assembly 54 also include chucks 55 for receiving the opposite ends of the rolls. Referring to FIG. 4, the assembly 54 consists of a shaft 58 to which has mounted toward the center of the machine the spindle nose or chuck 55 for chucking the roll core.

The opposite end of the shaft 58 has mounted thereon a slip ring 60 which is designed with 180° of its surface being formed of high conductive material 61 such as silver and the remaining 180° thereof is formed of non-metallic non-conducting material. Running against the surface of this slip ring 60 are two spring loaded brushes 63 and 64 which will have an electrical path formed therebetween every one-half revolution of the timing spindle assembly 54 through the material 61.

Also running off of the end of the spindle 58 through a timing belt 65 is a spindle tachometer 66 which provides an output signal which is used in the control circuit to monitor the diameter of the expiring roll. The tachometer 66 measures the rate of rotation of the roll when the spindle is supporting an expiring roll and the slip ring 60 is used to provide a signal indicating the location of the glue area when the spindle is supporting a new roll. Accordingly means are provided for initially adjusting the position of the slip ring 60 by means of a set screw 67 so that the conductive portion 61 may be correlated with a visual reference consisting of a locating key 70 formed on the spindle chuck 55.

Mounted on one end of the main shaft 22 adjacent the fixed spinder arm 28 is a collector ring assembly 72 (FIG. 2) which conducts the signals from the timing spindle assembly 54 to an external control box 73.

The opposite end of the main shaft 22 includes a rotary water union 74 for supplying cool water to the air brakes 50. Also a rotary switch assembly 75 is drivably connected to the shaft 22 for the purpose of defining an operating range which is known as the indexed or splicing position of the spindles A and B. The rotary switch assembly 75 is driven in timed relation from the shaft 22 by a timing chain drive 76 and includes a plurality of cam-operated rotary limit switches, as shown in FIG. 11 and as described in greater detail in connection with the operation of the invention. The assembly 75 also includes a multi-position switch 77 for indicating the diameter of the new roll by reading out the indexed position of the main shaft 22.

Means for rotating the main shaft assembly including the spider arms 27 and 28 to move the new roll 25 into its indexed position ready for splicing and to move the expiring roll rearwardly to the position shown in FIG. 1 includes a reversible drive motor 78 which drives the shaft 22 through a worm gear reducer 79. The motor 78 and reducer 79 are supported on the pedestal 23, as shown in FIG. 2, and are connected to the extended end of the shaft 22.

Paster assembly

The paster assembly 80 is preferably formed as a separate assembly from the main shaft assembly 20 and is mounted adjacent thereto and forms the means for accepting a web 82 being drawn from the expiring roll 26 carried on one pair of the inner spider arms of the main shaft assembly 20. For convenience of description, the spindle which is supporting the expiring roll 26 will be designated as spindle "A" and the spindle supporting the new roll 25 will be designated as spindle "B," although their relative positions will be reversed for the splicing of a following roll. The paster assembly 80 as shown in FIG. 1 is constructed of a pair of welded steel side frames 86 which are floor mounted and which are spaced apart by two rigid hollow rectangular cross tubes 88 and 89, designated respectively as front and rear cross tubes.

The front cross tube 88 has mounted on it means for bringing the new roll 25 up to line speed, and this means is designated generally at 90 as the speed-up mechanism. The mechanism 90 consists of a double scissors arm arrangement including arms 92 and 93 pivoted together at 94. The upper arm 92 has mounted on the end thereof one or more flat belt idler pulleys 96. Driving belt pulleys 97 are mounted on a drive shaft 98 which is rotatably mounted between the frames 86. The pulleys 96 and 97 support endless flat leather belts 100 which are tensioned by an air cylinder 103 connecting the lower extended end of the upper arm 92 with the lower arm 93. Any number of the belts 100 and the pulleys 96 and 97 may be provided in the speed-up mechanism 90 as the case may warrant depending upon the weights and speeds of the rolls to be handled.

Motor means for moving the speed-up belts 100 between a normally retracted position as shown in full lines in FIG. 1 in spaced relation to the new roll 25 to an operating position with the belts in engagement with the roll 25, includes a sector gear 105 mounted on the lower end of the arm 93, as shown in FIG. 3, and in engagement with a worm wheel 106 driven by a reversible air motor 110. By means of the air motor 110, the speed-up mechanism 90 is moved forward or back into and out of engagement with the new roll 25. The air motor 110 is permitted to stall into each limit position and therefore defines the force by which the belts 100 contact the roll.

The drive motor for the shaft 98 for rotating the roll is shown at 115 in FIG. 3 and is preferably a slaved speed-regulated D.C. drive motor which is coupled electrically to the main line drive so as to track or follow the line speed with accurate regulation, preferably not to exceed a speed tolerance of more than 2% throughout the total designed speed range. The starter for the motor 115 is preferably of the reduced voltage type, which may be capacitor discharge or current limited, to produce initial low starting torque to avoid slipping and cutting of the belts into the roll. The Bulletin 268 Starter, Style B, of Allen-Bradley Company may be used, which provides three acceleration points.

The paster assembly 80 includes means to effect the joining contact between the web 82 and the new roll 25 at a prepared paste area on the new roll adjacent the leading edge thereof. The prepared paste area preferably consists of pressure sensitive glue spread over a peripheral portion of the new roll 25 leaving untreated areas for the belts. Paster tabs are employed for retaining the leading edge of the roll in a manner well known in the art.

Mounted between the sloping portion of the side frames is a cross pivot shaft 120 which has mounted thereon a pair of pivot arms 122. Between the arms 122 at the upper end thereof is mounted a rubber covered aluminum idler roll 125 which forms a paster roll.

Each of the pivot arms 122 extend below the paster roll 125 and have attached to each arm at the front thereof a pneumatic loading cylinder 126. The opposite ends of the cylinders 126 are fastened securely to the lower portion of each of the side frames. The opposite arms 122 and the loading cylinders 126 may pivot independently of each other to produce an equalizing effect so that the paster roll 125 is free to follow the contour of the new roll 25.

The lower end of the paster roll arms 122 extend below the pivot 120 and each is provided with a stub cam follower 129. Opposite the cam followers 129 are mounted a pair of matched timing cams 130 which are keyed rigidly to a common drive shaft 131 (FIG. 6) mounted between the paster side frames with one end of the shaft 131 being extended through the frame for connection to a motor drive. Coil springs 132 at each side frame hold the followers 129 against the cams 130.

As shown in FIGS. 3 and 6, the shaft 131 is keyed rigidly to a right angle worm gear reducer 135. The reducer 135 is, in turn, driven by an electromagnetically controlled clutch and brake unit 136 and an A.C. reversing motor 138. The clutch and brake unit 136 may be the model K5 sold under the trade name "cycledyne" of Cycledynamics Incorporated, 19025 West Davison, Detroit 23, Michigan.

The clutch and brake unit 136 is electrically interlocked so that the drive clutch therein is engaged when the brake is simultaneously disengaged and vice versa. Therefore, the cam shaft 131 is rotated in either the forward or reverse direction by appropriate electrical signal with the motor 138 running at a constant speed providing constant and predictable operation of the paster roll.

A stop member 139 (FIGS. 7–8) is also carried on one end of the shaft 131 for engagement with the fixed stop 139' to define the limits of rotation of the cams 130. The rotation of the cams 130 is clockwise in FIGS. 3 and 7. This results in pivotal movement of the arms 122 on the pivot 120 and upward movement of the paster roll 125 on the arms 122 by the pneumatic loading cylinder 126, carrying the web 82 into engagement with the outer peripheral surface of the new roll 25.

The paster assembly 80 includes knife means which is operable free of the paster roll to sever the web 82 being drawn from the expiring roll 26. The knife means consists of a serrated steel knife blade 140 mounted on a transverse welded knife arm frame 141. The welded knife arm frame 141 is mounted for pivotal movement on the pivot shaft 120 in common with the arms 122. Therefore, the knife 140 pivots about the same axis as the paster roll 125.

The blade of the knife is preferably serrated with teeth of uniform size extending across the width of the machine. The uniform tooth is used for lighter grades of paper, foil or film, whereas a knife blade with irregular tooth form is used for board or tougher grades of material. An irregular tooth blade may be tapered so as to produce a shearing effect across the web of material at the time of cut-off.

The knife arm frame 141 has welded to each pivot end two lever arms 145 which are attached to the operating end of a pneumatic high-speed air cylinder 146. The cylinders 146 are, in turn, fixedly supported on the rear cross tube 89 by a bracket 148. The pneumatic cylinders 146 comprise knife motor or operating means connected to operate the knife 140 for severing the web 82 upon receipt of a pneumatic actuating signal.

Beneath the paster roll 125 is mounted a spring idler roll 150 for absorbing web tension transients. Next in the direction of web flow is a tension sensing idler roll 152 which may have mounted under one of the journal pillow blocks 153 a pneumatic transmitter for modulating a selected air supply to the spindle brakes for regulating a constant tension at all times. The web tension transmitter and modulators for varying and regulating the air pressure applied to the spindle brakes 50 may be constructed and operated according to the teachings of the United States patent to Pawlowski 2,922,594. Finally, in the direction of web flow, there is provided a squaring roll 155 for altering lateral web flow so as to cause it to track uniformly through the machine, in a manner well-known in the art.

*General theory of operation*

The operation of the control system of this invention is most readily understood by first outlining the requirements which are to be fulfilled by the controls. In the fully automatic mode of operation, the control system first determines when the main shaft assembly 20 may be indexed to a pasting position, to move a new roll which has been placed on the empty spindle into pasting position. Therefore, an expiring roll, which would be in the position of spindle B as shown in FIG. 1, must be moved rearwardly into the position shown as occupied by spindle A when it has reached a predetermined diameter to clear the paster assembly 80. FIG. 1 shows the expiring roll 26 after it has been brought rearwardly, and the control circuit includes provision for automatically determining when the expiring roll has been reduced to a diameter at which it may be indexed. For example, this diameter may be 20 inches.

The portion of the control circuit associated with the main shaft assembly 20 operates the main shaft indexing motor 78 to move the new roll 25 into its indexed pasting position, and stops the movement at a controlled location adjacent the pasting roll 125. During this time, the roll 26 on spindle A continues to expire and the control circuit continues to monitor the diameter of this roll.

The control circuit also moves the speedup belt assembly 90 into operative position and determines the point at which the belt's drive motor 115 becomes operative in accordance with the expected time of the splice, taking into consideration the line speed. The circuit then automatically initiates the operation of the belts 100 to bring the new roll 25 up to correct peripheral line speed. The control circuit continues to monitor the diameter of the expiring roll and when this diameter reaches a predetermined minimum diameter which has been set into the control circuit, a "ready-to-splice" signal is initiated. The control circuit, by means of the 180° split rings, now receives a splice signal which is correlated to the location of the glue and initiates the movement of the paster roll 125 providing for the roll-in of the new roll 25 and simultaneously initiates the operation of the knife 140.

The portion of the control circuit which operates the knife 140 includes provision for delaying the operation of the knife by a time which is proportional to the reciprocal of line speed of the moving web 82. Accordingly, the operation of the knife is not programmed to follow the operation of the paster roll 125 in a fixed or cascade fashion but is timed in accordance with line speed and other factors, and the signal for initiating this time-out is preferably the same signal which initiates the operation of the paster roll.

The length of time which must be provided for the initiation of the movement of the knife in order to provide a cut with a constant and predictable tail length beyond the glue area does not vary linearly with time but follows a generally parabolic curve for any given roll diameter, as shown in FIG. 13, and the system includes means for characterizing this curve and for adjusting a variable knife delay means in accordance with this curve. The time required by the knife 140 to intersect the web also varies in accordance with the diameter of the new roll, since a new roll which is of small diameter rotates at a higher angular velocity than a new roll of a greater diameter, and the glue area will require less time to make one revolution.

The theory of operation may be more fully understood by reference to FIGS. 12 and 13 which show the relationship of the new roll 25 being pasted, the paster roll 125 and the knife 140.

Referring to FIG. 12, the point of zero time is shown at the leading edge of the roll at the point which the paster tabs 158 are attached, and the glue area 160 extends rearwardly from this point. Provision is preferably made for 22 inches of glue regardless of the diameter of the roll to be spliced. The location of the index key 70 and the electrical location of the break in the split ring 60 is also shown in this FIG. 12 as coinciding with the leading edge of the glue. In other words, the roll 25 will rotate clockwise according to the arrow, and when the front edge of the glue and the paster tabs 158 reach the position indicated as zero time, a signal will be provided by the split rings 60 which will initiate the inward movement of the paster roll. The paster roll 125 will move the web 82 into running contact with the roll 25 for the remainder of the revolution through 360° thereby effecting the roll-in of the web and the joining of the leading edge by the glue.

The signal at the split ring also initiates the time-out sequence of the knife. Preferably, a tail length in the order of 8½ inches following the glue area is desired. The length of the tail may be computed from the following formula:

(1) $$L = \frac{ts}{5} + \frac{as}{5} + \left(\frac{82}{360}D - D\right) + (.0596D - 11) + 22$$

wherein: $l$=tail length in inches, $s$=line speed in feet per minute, $D$=roll in diameter in inches, $t$=knife time-out time in seconds, and $a$=.095 second, the arbitrary time which the knife takes to move into contact with the web once the knife firing signal has been given.

The above Formula 1 for tail length can be explained in the following terms: the tail length $l$ equals the sum of the following factors: the number of inches which the periphery of the roll moves during the timer timing out period, plus an additional number of inches which the roll will move during the fixed time of operation of the knife after the firing signal is given, plus the added length between the zero timing signal and the position of the paster roll (which is taken as 82°), plus a factor which accounts for the placement of the knife from the paster roll and the arc of knife travel minus 22 inches which is the length of glue actually applied, and minus the circumference of the roll in order to subtract out the single revolution which the roll makes after the initiation of the pasting signal. The above formula, solving for line speed ($s$), simplifies as follows:

(2) $$s = \frac{5(L + 2.24D + 11)}{t + .095}$$

One will note from the above Formula 2 that it contains four variables: the speed of the web, the length of the tail, the diameter of the roll, and the knife time-out time. We may now solve for time ($t$) in terms of line speed ($s$) by assuming a desired tail length ($l$) and a given roll diameter ($D$). Assuming that a tail length of 8½ inches is desired on a roll diameter of 48 inches, we arrive at the following formula:

(3) $$t = \frac{634}{s} - .095$$

It will be seen that Formula 3 describes an inverse relationship between the timer time ($t$) for the knife and the line speed ($s$) which forms a parabola, as plotted in FIG. 13. The curve of FIG. 13 is only valid for one roll diameter. Accordingly, the invention includes means for automatically setting roll diameter into the computing circuit to maintain a constant tail length. For instance, if roll diameter were not accounted for, a 48 inch diameter roll may be cut with an 8½ inch tail length while a 32 inch diameter roll, using time constant derived from the computation of a 48 inch diameter roll, would result in a 43.9 inch tail length.

The operation of the knife cylinders 146 is preferably controlled through a controlled time delay relay or timer 165 (FIG. 16) which is located in the control box 73. The timer 165 is of the "on-delay" type and provides a delay from the time an external contact is closed until its D.C. solenoid relay is closed. This variable delay is effected by means of a slide wire potentiometer 166 which is positioned external to the timer. A suitable timer for this purpose is described in Bulletin 852 Electronic Timing Relay of Allen-Bradley Company of Milwaukee, Wisconsin which includes a pair of normally open and normally closed contacts designated as NO and NC in the control box 73 in FIGS. 18–19. The operation of the timer 165 is initiated by the closing of an external contact concommitantly with the signal from the split rings, which in this case is a contact of a Trigger Relay TR.

The timer is caused to follow the parabolic curve of FIG. 13. There are several ways in which this can be effected, and one suitable way as shown in FIG. 15 is that of characterizing the input potentiometer 166' with resistors 167, the value of which have been empirically determined. The potentiometer 166' is then positioned by a suitable servo follow-up mechanism linearly according to the measured line speed, and the output of the time delay relay 165 will then simulate the curve of FIG. 13. A suitable servo mechanism for this purpose is the null-balancing slide wire servo mechanism of the type more fully described in connection with the description of Zone 2, below. Such a self-balancing servo circuit may be constructed according to the teachings of the U.S. patent to Willis 2,423,540 or may be the Model 6701 Single Point Recorder of Daystrom-Weston Industrial Division, Daystrom Inc., Poughkeepsie, New York.

Smoother, more consistent and more accurate results can be obtained by using a linear slide wire potentiometer 166 and by controlling its movement in a non-linear manner by causing the null-balancing servo mechanism to operate in a non-linear manner. A closed loop, slide wire type of servo amplifier is shown in FIG. 14. The amplifier A operates to position the slide wire R in such a manner that the voltage $e_2$ equals the voltage $e_1$, and in this respect, the null-balancing mechanism is as described in the above-mentioned Patent No. 2,432,540 and as sold commercially by the above-mentioned Model 6701.

For the purpose of this invention, a voltage E from a line speed tachometer is applied across the total resistance R. Since $e_1$ is a constant, the amplifier A will operate to position the slide wire R to the point where $e_2$ equals $e_1$. The position of the slide wire R, shown at $dR$, corresponds to the amount of movement of the input potentiometer 166 of the timer 165 and therefore represents the time delay $t$.

It therefore follows that:

$$e_2 = IdR$$
$$= (E/R)dR$$
$$= Ed$$

Therefore, $$D = \frac{e_2}{E} = \frac{1}{E} \times \text{a constant}$$

it can be seen from the above derivation that the position of the wiper on the slide wire resistor R follows the parabolic curve (3) as derived above in connection with FIG. 12, and this null-balancing amplifier circuit may therefore be used to position the slide wire potentiometer 166 of the timer 165 for simulating the curve of FIG. 13.

*The control box*

The control box 73 contains a major portion of the circuitry for the automatic operation of this invention. It includes an array of manually operated controls and push buttons which are shown on the wiring diagrams FIGS. 17–20 and includes the control relays associated therewith. The control box also includes the electronic control which characterizes the curve of FIG. 13. This is identified as Zone 1 in FIG. 16. The control box further contains the electronic servo mechanism which provides a signal for indexing the main shaft assembly 22 to bring a new roll into splicing position and for providing a "ready-to-splice" signal for effecting the actual splicing operation. This portion of the control system is designated as Zone 2 in FIG. 16.

The operation of the follow-up slide wire control of Zone 1 has been generally described in connection with FIG. 14. In FIG. 16, it is seen that the Zone 1 return slide wire R is connected in mechanical driving relation to the input slide wire resistor 166 of the timer relay 165, and positions the wiper of this resistor according to the curve of FIG. 13. The invention includes means responsive to the diameter of the new roll being spliced for modifying the splice signal to compensate for the different splicing times required with different diameter rolls. It will be remembered that the solution for Equation 3 above, assumed a given roll diameter, and that the time required for splicing varies with the diameter of the roll in that a shorter time is required for rolls of smaller diameter. The roll diameter responsive switch 77 is shown diagrammatically in FIG. 11 as being included in the rotary assembly 75 and movable into three positions according to the indexed position of the new roll.

The roll position selector switch is shown in greater detail in FIG. 15 as including three sets of three characterizing variable resistors for each of the three positions of the switch. These three resistors for each position provide separate control for the high speed end of the curve, the central portion of the curve and the low speed portion of the curve so that the output of the timer relay 165 accurately tracks to follow the desired curve. The three switch positions may each cover with reasonable accuracy a range of roll diameters. For instance, the small switch position may provide compensation for rolls of 32 to 42 inch diameter, the medium switch position may provide compensation for rolls of 40–52 inch diameter, and the large switch position may provide compensation for rolls of 50–60 inch diameters.

Zone 2 shows a conventional slide wire followup mechanism which may be substantially as shown in the above Patent No. 2,423,540. Zone 2 compares the output of a line speed tachometer with that of the selected spindle tachometer which is the tachometer on the spindle having the expiring roll. The line speed tachometers are preferably driven off of the master drive motor for the entire web treating or processing line, in a manner well known in the art.

The position of the slide wire 180 represents the diameter of the roll. Therefore, the position of the slide wire may be used to operate switches, which are known as "alarm" switches in the trade, to signal the coincidence of the wiper with any desired position. In this invention, at least two such switches may be employed, the first or indexing switch 182 signalling the point at which the expiring roll has reached a diameter sufficiently small for indexing, and the second or "splice" switch 183 signalling that the expiring roll has reached the predetermined splicing diameter.

The "splice" switch 183 is preferably adjustable over a range of positions to provide selection of the splicing diameter, so that cores of differing sizes may be accommodated, and so that adjustment may be provided for the optimum splicing point with a minimum of material remaining on the core after splice. It is also within the scope of this invention to provide a plurality of "splice" switches 183 positioned for operation at different positions of the slide wire 180 for selection according to the size of the core being run.

Sequence of operation

The sequence of operation is described with relation to FIGS. 1–11 which show the mechanical arrangement of the apparatus and the wiring diagram of FIGS. 17–20. The figures of the wiring diagram have been provided with reference or line numbers on the left-hand margin which represent line positions on the diagram. The right-hand margin includes groupings of these line numbers, some of which are underscored. For instance, the following grouping of numbers appears on the line 15 in the right-hand margin adjacent relay CR1: 13, 16, 18, 82, 84, 72. These numbers designate the line positions at which relay CR1 has operating contacts. The number which is underscored indicates that the contact is normally closed, or, in other words, is a "back" contact of this relay. For instance, it will be seen that relay CR1 (line 15) includes a normally open contact in the circuit for motor control relay M3U (line 13) and includes a normally closed contact (line 18) in series with relay CR2. This explanation applies to each of the numbers or groups of numbers appearing in the right-hand column opposite each relay.

For further facilitating the understanding of the operation of this invention, reference may be had to Table I which shows the position and function of each of the limit switches. Reference may also be had to Table II which tabulates the relays, designating the line in which the relay operating coil occurs in the wiring diagram, with an abbreviated statement of some of the more important functions of the relay.

A new roll of paper to be spliced is brought up to a loading position below the open pair of spindle arms 35–36 or 37–38 subsequent to the removal of the empty core. The roll is then lifted in any suitable manner, such as by hydraulic jacks, and the opposed core supporting spindles 50 and 54 are brought into core engagement by the manipulation of the self-centering air valve 47 which controls the air motors 45 or 46 for the operation of the turn buckle screws 40 or 41. This brings the noses of the respective spindles into the end of the core and supports the core and roll, at which time the lifting mechanism may be removed.

The preparation of a glue area for the splice then proceeds in the normal manner having reference to the key 70 of the timing spindle 54 so that the leading edge of the splice and the tabs 158 are in radial alignment with the key 70. A radial line drawn from the key 70 on the edge of the roll facilitates the preparation of the glue area.

At this time, the operator then pushes the Ready push button PB–12 (line 22) which closes the automatic relay AUR. For the purpose of this discussion, it is assumed that the new roll 25 is located on spindle B and the expiring roll 26 is located on spindle A, prior to indexing, as shown by the broken lines in FIG. 1. Since the web is now running off the roll on spindle A, the A brake button PB–15 (line 24) has been depressed which operates the A brake relay BAR and also operates the A spindle relay ASR (line 26). The A spindle relay has contacts in line 66 which select the tachometer 66 on the A spindle and in line 41 which select the split rings 60 on the B spindle. Similarly, the operation of the B brake push button PB–17 (line 29) operates the B brake solenoid SOL–4 and the B signal relay BSR (line 30) which selects the B tachometer and the A slip rings.

The tachometer on the A spindle monitors the diameter of the expiring roll through Zone 2 in the control box 73. When the expiring roll has reached a predetermined diameter where it may be moved rearwardly to the position shown in full lines in FIG. 1, the indexing switch 182 (FIG. 16) is closed. The closing of this switch closes a circuit to operate the indexing control relay CR6 (line 74). The operating of relay CR6 closes a contact in line 32 which closes the auto index relay CR3 through a pair of closed contacts of the relay AUR. The operation of relay CR6 also closes a pair of control contacts (line 69) to the splicing switch 183, and closes an arming contact in the circuit for control relay CR1.

The auto index relay CR3 initiates an audible warning signal by closing a circuit to an alarm 185 (line 88) for the purpose of warning operators further down the processing line that a splice will soon be made so that they can take whatever precautions are necessary to permit the splice to pass through the following web treating or handling equipment. The relay CR3 also closes a pair of contacts in the circuit for the index motor relay M1F (lines 4 and 5). Accordingly, the indexing motor 78 is energized to cause the rotation of the main shaft 22 to bring the expiring roll from the position shown in the broken lines in FIG. 1 to the full line position at the paster assembly 80.

The new roll 25 is carried on the main shaft assembly 20 up over the top and toward the paster roll 125. A photocell control 188 which includes a photocell 190 is arranged so that the light beam is interrupted by the periphery of the new roll when it is approximately one inch from the paster roll, thereby deenergizing the index motor 78. The photoelectric control 188 is indicated diagrammatically on FIG. 17, and the physical location of the photocell 190 is shown in FIG. 1. The photoelectric relay PER contains contacts in line 5 which are operated upon the interruption of the light beam to stop the forward indexing. The relay CR3 remains operative during the subsequent speed-up of the new roll 25. In case the new roll is out-of-round, the photocell circuit 188 remains operative by means of relay CR3 to reposition the roll during speed-up so that the roll is positioned by its mean diameter from the paster roll 25.

The movement of the shaft 22 into the indexing or pasting position operates the microswitch assembly 75 to position the cams of the zone-defining switches LS7, LS8, LS9 and LS11. The lobes on these cams correspond generally to the pasting zones for the spindles A and B and operate to prevent certain automatic functions when the carriage of the main shaft assembly 20 is in any position other than in a pasting zone.

The index relay CR6 also closes a contact in line 17 to operate control relay CR1 through the closed contacts of either relays CR8 or CR9 (lines 78 or 79) depending upon which spindle is in the splicing position, as determined by the position of the zone limit switches LS8 and LS9 (see also FIG. 11). The relay CR1 operates to bring the speed-up belts 100 into operating position and therefore has contacts in line 82 which control a solenoid SOL–5 for the air motor 110 (FIGS. 1 and 3). The operation of the air motor 110 by the application of air thereto through valve SOL–5 causes the rotation of the worm gear 106 in driving relation to the sector gear 105 to move the assembly 90 into the broken line position shown in FIG. 1 with the belts 100 in peripheral contact with the new roll. The air motor 110 is permitted to stall thereby providing the desired force of contact of the belts 100 against the roll 25.

The inward movement of the speed-up belt assembly 90 operates the microswitches LS3 and LS4 (see FIG. 9) which have contacts in line 6 and lines 18 and 20. These switches prevent reverse indexing by the motor relay M1R when the speed-up belts are in, and also close a circuit to the control relay CR2.

The operation of relay CR1 also initiates the operation of the motor 138 for the paster roll preparatory to splicing. However, at this time, the cam shaft 131 will not be rotated due to the fact that the clutch and brake unit 136 has not been actuated. However, during the speed-up of the new roll 25, the reversible paster motor 138 is permitted to come up to speed so that it will be operating at full speed to provide instantaneous initiation of the movement of the cams 130 with the paste signal.

The invention includes means for delaying the starting of the motor 115 for the speed-up belts 100 in order to reduce as much as practical the free turning time of the new roll 25. This means includes a pneumatic time delay relay TD1 (line 16) which is operated concurrently with the operation of the speed-up belt relay CR1 to effect the starting of the belt motor 115 by a delayed time. The delayed starting of the motor 115 may be adjusted in accordance with the expected time of the splice so that the new roll is brought up to speed approximately 30 seconds prior to the splice. The relay TD1 is of the type which employs an air bellows with an adjustable rate of movement which may be adjusted by a set screw for the closing of the contacts from little delay up to several minutes delay. A suitable such relay is the Bulletin 849, Style H, of Allen-Bradley, Milwaukee, Wisconsin.

It will be seen that the time delay relay TD1 includes control contacts in line 9 in series with the starter 195 for the motor 115 to control the delayed operation thereof. The starter 195 has been described above under the heading of "paster assembly" as being of the reduced voltage type for control of the initial starting torque of the belts against the roll.

The roll 26 on spindle A continues to expire, and when it has reached a predetermined small diameter, the controls of Zone 2 will close the contacts of the splice switch 183 thereby providing a "ready-to-splice" signal. The splice switch 183 closes the circuit to the splice relay CR5 in line 73 which is then self-folding through a pair of normally open contacts in the same line.

Relay CR5 also closes the circuit leading from the split ring 60 of the B spindle and applies the signal from the split ring to a resistive sensitive relay RSR (FIG. 18). The relay RSR is shown with a diagrammatic view of the internal arrangement shown alongside. It is preferably a fast-acting vacuum tube relay which operates with a minimum of time delay. The relay part No. 44B201083 of General Electric Company, Specialty Control Division, Waynesboro, Virginia, may be used for this purpose.

Relay CR5 also arms the set-up relay SUR in line 34. Relay SUR is closed during the next non-conductive 180° rotation of the timing spindle. The set-up relay is self-holding and operates, in turn, to arm the trigger relay TR in line 33 so that the trigger relay will be fired just as soon as the conductive portion 61 of the split ring contacts the brushes 63. When this happens, the resistive sensitive relay RSR is operated to close the circuit to the trigger relay TR which is self-holding through its own front contacts.

The trigger relay TR has two functions. First, it initiates action which will result in the roll-in of the splice. Second, it initiates the operation of the knife timer 165 to effect the cutting of the web. The closing of the trigger relay TR upon the signal from the split rings 60 on the timing spindle of the new roll operates to close the control relays CR4 and CR4a for the electric clutch and brake control unit 136 for the paster roll cams. It will be seen from an examination of FIG. 19 (line 52) that the operation of these relays deactivates the brake portion 200 and activates the clutch portion 201 to connect the cam shaft 131 in driving relation to the motor 138. This effects the rotation of the shafts 131 as indicated in FIGS. 7 and 8, which rotation is at a controlled rate, and causes the cam follower 129 on the arm 122 to move inwardly along the involute form of the cams 130.

The extent of rotation of the shaft 131 is controlled by the limit switches LS12 and LS13 which operate at the end of the shaft 131 by cams 205, as shown in FIG. 10. In case the switches LS12 or 13 should fail to operate, the mechanical stop 141 is provided to contact the stop arm 140 so that the follower 129 never falls off the sharp end but always works on the cam surface.

The rotation of the cam shaft 131 permits the rotation movement of the paster arms 122 on the pivot shaft 120, and the force provided for this movement consists of the load cylinders 126 and the cam follower springs 132. The amount of force which is applied by the paster roll 125 against the new roll 25 may be controlled by controlling the air pressure within the load cylinders 126.

It will be seen from an examination of FIG. 12 that the paster roll 125 is timed to bring the web 82 into contact with the surface of the roll 25 just after the glue area 160 has passed the paster roll position and remains in contact for one full revolution to assure roll-in and adjoining of the leading edge of the roll 25 to the web.

The operation of the trigger relay is also the means for initiating the timing out action of the knife timer relay 165 upon signal from the timing spindle by the closing of a pair of contacts in line 69. The input potentiometer 166 has been adjusted by Zone 1 to time-out the operation of the knife 140 according to the time versus line speed relationship described above in connection with FIG. 13. The operation of the timer 165 is concluded by the closing of its NO contacts (FIG. 19) thereby completing a circuit from line 71 to the knife cut solenoids SOL-2 and SOL-3 through closed limit switch LS11 and LS12.

The initial upward movement of the knife 140 opens LS15 and prevents manual reverse indexing when the knife is up. This is an interlock control to prevent damage to the knife. At the conclusion of the knife stroke, limit switch LS10 is actuated by a cam 208 (FIG. 7) on the knife cross shaft 120. The switch LS10 (line 31) operates momentarily to close the reset relay RR which, in turn, resets all automatic circuits.

First, relay RR opens the power to the splice relay CR5 and the auto relay AUR and they drop out. The reset relay also drops out relay CR1 and pulls in relay CR2 which effects the return of the speed-up belt mechanism 90. When CR2 operates it closes a path to relay M3D in line 14 to reverse the rotation of the paster roll motor 138. Relay CR2 also closes a parallel circuit to the control relay for the clutch and brake unit 136 by operating relay CR4 which effects the counterrotation of the cams 30 to their normal or rest position which is shown in full line in FIG. 7. Relay CR2 also closes a circuit to the solenoid valve SOL-6 for the return operation of the speed-up belt assembly motor 110. When the speed-up belt 90 returns to its rest position, it opens one contact in LS3 and one contact in LS4 which drops out control relay CR2, and the automatic cycle is concluded.

The reset relay RR has the further function of applying high air pressure to the brake of the spindle carrying the expiring core and provides the control means for applying high braking torque to stop the rotation of the core and prevent following by the cut web. This is important during a high speed splice to prevent the following of the spliced web by the severed ends of the web leading to the expiring core. It will be seen that relay RR has contacts in line 93 which control the operation of high pressure brake solenoids SOL-15 and SOL-16. These solenoids are connected to apply high air pressure to the brake spindles 50 and are selected by the relays BBR and BAR. Thus one of the solenoids SOL-15 or SOL-16 will be operated at the end of the knife stroke to apply extra braking effort to the core to arrest rotation.

*Manual operation*

The control system of this invention includes provision for the manual operation of the various steps or the manual overide of any particular step. Thus, the main shaft assembly 20 may be manually indexed in either the forward or the reverse position by means of the push buttons PB-1—BP-6 in lines 2-8. Similarly, the speed-up belts may be moved in or out by push buttons 10 and 11 in lines 15 and 18. The splice may be made manually by pushing the forward index push button to cause the new roll to come into physical contact with the web 82 moving over the paster roll 125, without moving the paster roll up, if this should be necessary. The knife cut may then be made by operating the manual cut button PB-15 in line 76.

The invention further includes a semi-automatic mode of operation, if this should be desired. After indexing, as described above, with the forward indexing manual control, the operator may depress the manual roll and splice button PB-18 in line 72. This operates the splice relay CR5 and from thereon the splicing in the time-out of the knife is fully automatic, as described above.

TABLE I.—LIMIT SWITCHES

| Switch | Fig. No. | Function |
|---|---|---|
| LS-1 | 9 | Normally open switch held closed when paster roll is down, prevents indexing when paster roll is up. |
| LS-2 | 1 | Normally closed, prevents indexing a full roll in reverse. |
| LS-3 and 4 | 9 | Switch opens when speedup belts move in, prevents reverse indexing. Has N.O. contacts which close to signal speedup belts have moved in. |
| LS-7 | 11 | Zone switch closed when new roll is in proper zone defining indexed position and prevents move-in of speedup belts outside of pasting zone. |
| LS-8 | 11 | Zone switch selects spindle "A." |
| LS-9 | 11 | Zone switch selects spindle "B." |
| LS-10 | 7 | Normally open switch closes at end of knife stroke to reset all automatic circuits. |
| LS-12 | 10 | Operated by the movement of the paster roll, normally closed and opens when paster roll is up to release clutch and apply the brake of unit 136. Also contains N.O. contact (line 76) which arms knife cut circuits. |
| LS-13 | 10 | Closes when paster roll is down to open clutch and apply brake to unit 136. |
| LS-14 | 9 | Normally closed, opens when speedup belts move back to drop out A or B brake lockup pressure (line 93). |
| LS-15 | 7 | Normally open, held closed by knife and opens when knife is up to prevent reverse indexing (line 6). |

TABLE II.—RELAYS

| Relay | Function |
|---|---|
| M1F (line 4) | Motor relay for forward indexing. |
| M1R (line 6) | Motor relay for reverse indexing. |
| M3U (line 13) | Starter for reversible paster motor 138, starts motor preparatory to splicing. |
| M3D (line 14) | Starter for reversible paster roll motor 138, reverses direction of rotation preparatory to retraction of paster roll after splice. |
| CR1 (line 15) | First control relay, brings speed-up belts in and arms other circuits. |
| TD1 (line 16) | Pneumatic timer relay for delayed start-up of speed-up belts. |
| CR2 (line 18) | Second control relay, retracts speed-up belts, disarms paster roll motor and clutch-brake control. |
| AUR (line 22) | Automatic arming relay operated by "ready" push button and arms relay CR1, CR3, CR5, knife solenoids, and connects spindle tachometers to control box. |
| BAR (line 24) | Operates solenoid for the brake on "A" spindle. |
| ASR (line 26) | Operates with relay BAR to select tachometer on "A" spindle and to select slip rings on "B" spindle for the splicing of roll on spindle "B." |
| BBR (line 28) | Operates air brakes on "B" spindle. |
| BSR (line 30) | Operates with relay BBR to select tachometer on "B" spindle and slip rings on "A" spindle preparatory to splicing of a new roll on "A" spindle. |
| RR (line 31) | Resets all automatic circuits by openings CR1, CR2, CR5 and AUR. |
| CR3 (line 32) | Automatic index relay, operates on signal to control relay M1R and operates an audible splice warning alarm. |
| TR (line 33) | Trigger relay, initiates splicing operation by initiating movement of the paster roll and initiating time delayed operation of the knife. |
| SUR (line 34) | Set-up relay, fires on non-conductive half of split ring and arms trigger relay TR. |
| RSR (lines 35–37) | Resistive sensitive relay, fast-acting relay which operates from split-ring splicing signal. |
| CR4 (line 48) | Control relay, controls operation of clutch and brake unit 136 for paster cams. |
| CR5 (line 73) | Splice relay, operates on "ready-to-splice" signal from control box to arm set-up relay SUR. |
| CR6 (line 74) | Roll positioning relay, operates when expiring roll is ready for indexing to control relay CR3. |
| CR8 (line 78) | Selects "A" spindle by controlling relays BAR and ASR. |
| CR9 (line 79) | Selects "B" spindle by controlling relays BBR and BSR. |

*Conclusions*

It can therefore be seen that this invention provides a fully controllable and yet fully automatic splicing unwind. It provides in a single apparatus the means for operating over a wide range of speeds to provide cuts with a controlled and a minimum length of tail behind the splice or glue area. It prevents the unwinding of the new roll by controlling the time at which the new roll is brought up to speed. It provides compensation automatically for differing diameters of new rolls. It computes a curve for the operation of the knife and operates the knife with a time delay according to this curve and according to the line speed of the web. It provides for uniform rate operation of the paster roll to the end that the operation thereof is both positive and predictable.

While the form of apparatus and the method herein described constitute a preferred embodiment of the invention, it is to be understood that the invention is not limited to this precise apparatus and method, and that changes may be made therein without departing from the scope of the invention which is defined in the appended claims.

What is claimed is:

1. An automatic unwind for joining the leading edge of a new roll of web material onto a web drawn from an expiring roll of such material comprising, means supporting said new roll and said expiring roll for rotation in spaced apart relation, paster means for joining said new roll with said web, knife means operable upon a signal for severing said web between said paster means and said expiring roll, means measuring the line speed of said web and providing an electrical signal which is proportional to such line speed, and an electrical computer controlled by said line speed signal and connected to control the initiation of operation of said knife means following the initiation of operation of said paster means by a delay in time which is represented by the formula $$x = \frac{k}{y}$$

where $x$ is delay in time measured from said initiation of said paster means, $k$ is a constant, and $y$ is line speed.

2. An automatic unwind for joining the leading edge of a new roll of web material onto a web drawn from an expiring roll of such material comprising, means supporting said new roll and said expiring roll for rotation in spaced apart relation, paster means for joining said roll with said web, knife means operable upon a signal for severing said web leading from said expiring roll, control means for said knife means including means for measuring the line speed of said web, variable time delay means connected to provide the cutting signal for said knife means and controlled by said line speed measuring means for delaying the initiation of knife movement by an amount which decreases with increasing line speed, and further means responsive to the diameter of said new roll and connected to modify the operation of said delay means to decrease the delay thereof with decreasing diameter of said new roll.

3. An automatic unwind for joining the leading edge of a new roll of web material onto a web drawn from an expiring roll of such material comprising, means supporting said new roll and said expiring roll for rotation in spaced apart relation, servo means responsive to the diameter of said expiring roll for signaling the occurrence of a minimum diameter providing a ready-to-splice signal, knife means operable upon a cutting signal for severing said web leading from said expiring roll, control means for said knife means including means for measuring the line speed of said web, a variable time delay relay connected to provide said cutting signal for said knife means and operable upon said ready-to-splice signal to initiate time out of the operation thereof, and further servo means controlled by said line speed measuring means connected to said relay delaying the initiation of knife movement by an amount which decreases with increasing line speed.

4. An automatic unwind for joining the leading edge of a new roll with the web from an expiring roll, comprising means supporting said expiring roll and said new roll for rotation adjacent the web being drawn from said expiring roll, means for measuring the line speed of said web, paster means operable upon a pasting signal to join the leading edge of said new roll with said web, a web cutting knife, means mounting said knife for web severing movement into the path of said web between said rolls, knife motor means connected to operate said knife to sever said web upon a signal, control means for operating said knife motor including a controllable variable time delay relay operable upon said paster signal and connected to operate said knife motor a measured time thereafter, and servo means controlled in response to said line speed measuring means and connected to control said relay for varying the delayed operation thereof inversely in relation to the line speed.

5. The unwind of claim 4 wherein said servo means is non-uniform in response and is characterized to vary said delay according to the formula $$x = \frac{K}{y}$$

where $x$ is delay, $K$ is a constant, and $y$ is line speed.

6. In an automatic pasting unwind, including means for supporting the core of an expiring roll and for supporting a new roll with indexing motor means for moving said new roll adjacent the web from the expiring roll together with paster means for joining the leading edge of said new roll with said web and knife means for thereafter severing the web leading to said expiring roll, the improvement comprising line speed tachometer means connected to provide a signal proportional to the line speed of said web, core speed tachometer means connected to provide a signal proportional to the angular velocity of said expiring roll, first servo means connected to receive and compare signals from each of said tachometer means and having switch means for providing an indexing signal upon the occurrence of a first diameter of said expiring roll for operating said indexing motor means and for providing a ready-to-splice signal upon the occurrence of a second diameter smaller than said first diameter, second servo means connected to receive a signal from said line speed tachometer means, and a variable time delay relay operable in response to said ready-to-splice signal having an input controlled by said second servo means in response to line speed and having an output connected to control said knife means and variable by said second servo means to provide decreasing delay of knife operation with increasing line speed.

7. In an automatic pasting unwind, including means for supporting the core of an expiring roll and for supporting a new roll with indexing motor means for moving said new roll and the web from the expiring roll into adjacent positions together with paster means for joining the leading edge of said new roll with said web and knife means for thereafter severing the web leading to said expiring roll, the improvement comprising line speed tachometer means connected to provide a signal proportional to the line speed of said web, core speed tachometer means connected to provide a signal proportional to the angular velocity to said expiring roll, signal comparing means connected to receive signals from each of said tachometer means and having switch means for providing an indexing signal upon the occurrence of a first diameter of said expiring roll for operating said indexing motor means and for providing a ready-to-splice signal upon the occurrence of a second diameter smaller than said first diameter, and servo means connected to receive a signal from said line speed tachometer means and having an output which varies according to the reciprocal of line speed, and variable time relay means controlled by said servo output and having an output connected to control said knife means and variable by said servo means to provide decreasing delay of knife operation with increasing line speed.

8. In an automatic pasting unwind, including means for supporting the core of an expiring roll and for supporting a new roll with indexing motor means for moving said new roll adjacent the web from the expiring roll together with paster means for joining the leading edge of said new roll with said web and knife means for thereafter severing the web leading to said expiring roll, the improvement comprising line speed measuring means connected to provide a signal proportional to the line speed of said web, core speed measuring means connected to provide a signal proportional to the angular velocity of said expiring roll, first servo means connected to receive signals from each of said measuring means for providing an indexing signal upon the occurrence of a first diameter of said expiring roll for operating said indexing motor means and for providing a ready-to-splice signal upon the occurrence of a second diameter smaller than said first diameter, and a second servo means connected to receive a signal from said line speed measuring means, variable time delay circuit closing means having a variable delay control positioned by said second servo means and having contacts operable upon the conclusion of a delay which is variable by said second servo means to provide increasing delay of contact operation with decreasing line speed, and means connecting said contacts to control the initiation of operation of said knife means.

9. An automatic pasting unwind for joining the leading edge of a new roll of paper which has been previously prepared with a glue area onto the web drawn from an expiring roll comprising, means rotatably supporting said expiring roll and said new roll, a paster assembly, controllable web joining means on said assembly operable to effect joining contact between said web and said new roll at said glue area, separately controllable knife means on said assembly operable independently of said web joining means to sever said web from said expiring roll, signal means connected for rotation with said new roll for signaling the movement of said glue area past said paster assembly, a control circuit connected to operate said web joining means upon a signal from said signaling means, and further control means including variable delay means operable upon signal from said signal means and connected to operate said knife means with a delay measured from the occurrence of said signal from said signal means.

10. An automatic pasting unwind for joining the leading edge of a new roll of paper which has been previously prepared with a glue area onto the web drawn from an expiring roll comprising, means rotatably supporting said expiring roll and said new roll, a paster aseembly, paster means on said assembly operable upon signal to effect joining contact between said web and said new roll at said glue area, separately controllable knife means on said assembly operable independently of said paster means to sever said web from said expiring roll, a timing spindle forming a part of said new roll supporting means having means therein for signaling the movement of said paste area past a reference point, a control circuit connected to receive the signal from said timing spindle to operate said pasting means immediately upon said signal, and further control means including a variable time delay relay connected to receive said signal and to operate said knife means with a variable delay measured from the occurrence of said signal.

11. An automatic unwind for joining the leading edge of a new roll of web material onto a web being drawn from an expiring roll of such material, comprising means rotatably supporting said new roll and said expiring roll in spaced apart relation, a paster assembly adjacent said supporting means having means thereon for guiding said web as it is drawn from said expiring roll, a pair of paster arms pivotally mounted in spaced apart relation on said assembly on opposite sides of said web, web paster means supported on said arms and extending therebetween movable by pivotal movement of said arms to move said web into running engagement with the peripheral surface of said new roll, paster operating means including a cam shaft, timing cam means mounted on said cam shaft, follower means on said arms engaged with said cam means for movement thereon, and control means operable upon signal and connected to rotate said cam shaft in timed relation to a fixed point on said new roll for joining the leading edge thereof with said web.

12. An automatic unwind for joining the leading edge of a new roll of web material onto a web being drawn from an expiring roll of such material, comprising means rotatably supporting said new roll and said expiring roll in spaced apart relation, a paster assembly adjacent said supporting means having means thereon for guiding said web as it is drawn from said expiring roll, a pair of paster arms pivotally mounted in spaced apart relation on said assembly on opposite sides of said web, a paster roll supported on said arms and extending therebetween for passing of said web thereover and movable by pivotal movement of said arms to place said web into running engagement with the periphery of said new roll, paster roll operating means including a cam shaft, a pair of matched timing cams mounted on said cam shaft, there being one cam for each of said arms, follower means on said arms engaged with said cams for movement thereon, and control means operable upon signal and connected to rotate said cam shaft in timed relation to a fixed location on said new roll for joining the leading edge thereof with said web.

13. An automatic unwind for joining the leading edge of a new roll of web material onto a web being drawn from an expiring roll of such material, comprising means rotatably supporting said new roll and said expiring roll in spaced apart relation, a paster assembly adjacent said supporting means having means thereon for guiding said web as it is drawn from said expiring roll, a pair of paster arms pivotally mounted in spaced apart relation on said assembly on opposite sides of said web, a paster roll supported on said arms and extending therebetween for passing of said web thereover and movable by pivotal movement of said arms to place said web into running engagement with the periphery of said new roll, paster roll operating means including a cam shaft, a pair of cams mounted on said cam shaft, there being one cam for each of said arms, follower means on said arms engaged with said cams for movement thereon, a paster motor and an electric clutch and brake unit connecting said motor to rotate said cam shaft upon signal for joining the leading edge of said roll with said web.

14. An automatic unwind for joining the leading edge of a new roll of paper onto the web being drawn from an expiring paper roll comprising, means supporting said expiring roll and said new roll, controllable web joining means operable to effect joining contact between the web from said expiring roll and said new roll, separately controllable web severing means operable upon a signal to sever the web from said expiring roll, means for measuring the line speed of said web and for providing a signal proportional thereto, and a control circuit for said web severing means including an electrical computer connected to receive said line speed signal and having variable delay means controlled by said line speed signal for initiating operation of said web severing means following the operation of said web joining means by a delay in time which varies as a reciprocal function of said web line speed.

15. The unwind of claim 14 in which said computer approximates the function $$x = \frac{k}{y}$$

where $y$ is line speed, $k$ is a constant, and $x$ is delay in time measured from the operation of said web joining means.

16. The unwind of claim 15 including means for modifying the operation of said computer in accordance with the diameter of said new roll to decrease the time $x$ with decreasing roll size.

References Cited by the Examiner

UNITED STATES PATENTS

| | | | |
|---|---|---|---|
| 1,550,315 | 8/1925 | Hammer | 242—58.2 |
| 2,120,778 | 6/1938 | Dunlap | 242—58.2 |
| 2,160,526 | 5/1939 | Tollison | 242—58.5 |
| 2,167,810 | 8/1939 | Mackley | 242—58.5 |
| 2,596,189 | 5/1952 | Wieking | 242—58.2 |
| 2,703,681 | 3/1955 | Jacobs | 242—58 |
| 2,776,802 | 1/1957 | Phelps | 242—58 |
| 2,963,234 | 12/1960 | Chase et al. | 242—58.3 |
| 2,997,248 | 8/1961 | Chase et al. | 242—58.3 |
| 2,998,205 | 8/1961 | Francik | 242—58.3 |
| 3,015,454 | 1/1962 | Flannery et al. | 242—58.2 |
| 3,062,466 | 11/1962 | Chase et al. | 242—58.3 |
| 3,100,604 | 8/1963 | Degutis et al. | 242—58.3 |
| 3,103,320 | 9/1963 | Huck | 242—58.3 |

MERVIN STEIN, *Primary Examiner.*

LEYLAND M. MARTIN, *Examiner.*

D. E. WATKINS, *Assistant Examiner.*